(12) United States Patent
Wilson et al.

(10) Patent No.: US 10,487,932 B2
(45) Date of Patent: Nov. 26, 2019

(54) VEHICLE DIFFERENTIAL

(71) Applicant: GM GLOBAL TECHNOLOGY OPERATIONS LLC, Detroit, MI (US)

(72) Inventors: William J. Wilson, Commerce, MI (US); Debkumar Rakshit, Novi, MI (US); Steven G. Trombat, Troy, MI (US); Jevon Kennell, Howell, MI (US); Dan E. Revers, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 15/365,032

(22) Filed: Nov. 30, 2016

(65) Prior Publication Data

US 2018/0149254 A1    May 31, 2018

(51) Int. Cl.
| | | |
|---|---|---|
| *F16H 48/38* | (2012.01) | |
| *F16H 48/40* | (2012.01) | |
| *F16H 48/08* | (2006.01) | |

(52) U.S. Cl.
CPC ............ *F16H 48/40* (2013.01); *F16H 48/08* (2013.01); *F16H 2048/385* (2013.01)

(58) Field of Classification Search
CPC .... F16H 2048/385; F16H 48/40; F16H 48/08; F16H 48/38; F16H 57/00; F16H 57/0018; F16H 57/0025; Y10T 403/7026; Y10T 403/7035; Y10T 403/7028; Y10T 403/63; Y10T 74/19888; Y10T 74/19893; F16C 2226/12; F16C 2226/80; F16C 3/02; F16C 222/12; F16D 1/072; F16D 1/101; F16D 2001/103; F01D 5/026; F02C 7/32; F02C 7/36; F02C 3/02; F02C 7/277

USPC .............. 475/220, 243, 244, 230, 231, 233; 74/437, 438; 29/893, 893.1, 893.2
See application file for complete search history.

(56) References Cited

U.S. PATENT DOCUMENTS

| | | | | |
|---|---|---|---|---|
| 5,330,284 A | * | 7/1994 | Persson ................. | F16C 35/042 29/253 |
| 5,598,631 A | * | 2/1997 | Umezawa ............ | B21D 53/845 29/888.011 |
| 6,152,604 A | * | 11/2000 | Ostling ................. | F16C 35/073 384/478 |
| 8,747,275 B2 | * | 6/2014 | Shioiri .................... | F16H 48/08 29/893.2 |
| 8,893,575 B2 | * | 11/2014 | Taniguchi .............. | B21K 25/00 29/505 |
| 9,017,213 B2 | * | 4/2015 | Taniguchi ............... | F16H 48/38 29/509 |

(Continued)

*Primary Examiner* — Jeffrey A Shapiro
(74) *Attorney, Agent, or Firm* — Cantor Colburn LLP

(57) ABSTRACT

A differential housing includes a body including an outer surface. The body has a first end, a second end, and an intermediate portion extending therebetween. A ring gear support member extends outwardly of the body at the second end. A ring gear support surface forms a first section of the intermediate portion. The ring gear support surface defines a first outer diameter of the intermediate portion. A ring gear is mounted to the outer surface of the body. The ring gear includes an inner annular surface having a first region defining a first inner diameter and a second region defining a second inner diameter. The first region includes a sawtooth profile to establish a desired alignment of the ring gear and the body and the second region facilitating an interference fit with the ring gear support surface.

13 Claims, 7 Drawing Sheets

(56) References Cited

U.S. PATENT DOCUMENTS

| | | | | |
|---|---|---|---|---|
| 9,068,640 B2* | 6/2015 | Taniguchi | ............... | F16H 48/40 |
| 9,297,449 B2* | 3/2016 | Taniguchi | ............... | F16H 48/38 |
| 9,458,871 B2* | 10/2016 | Ishizaki | ................... | B62D 1/20 |
| 10,012,302 B2* | 7/2018 | Kiten | ..................... | F16H 48/40 |
| 2011/0319220 A1* | 12/2011 | Shioiri | ................... | F16H 48/08 |
| | | | | 475/220 |
| 2012/0311845 A1* | 12/2012 | Taniguchi | ............... | B21K 25/00 |
| | | | | 29/522.1 |
| 2012/0329599 A1* | 12/2012 | Taniguchi | ............... | F16H 48/38 |
| | | | | 475/160 |
| 2013/0035196 A1* | 2/2013 | Taniguchi | ............... | F16H 48/38 |
| | | | | 475/331 |
| 2013/0074648 A1* | 3/2013 | Taniguchi | ............... | F16H 48/40 |
| | | | | 74/606 R |
| 2013/0074649 A1* | 3/2013 | Taniguchi | ............... | F16H 48/40 |
| | | | | 74/606 R |
| 2015/0275946 A1* | 10/2015 | Ishizaki | ................... | B62D 1/20 |
| | | | | 403/359.1 |
| 2017/0074389 A1* | 3/2017 | Bodary | ............... | F16H 57/0423 |

* cited by examiner

VEHICLE DIFFERENTIAL

FIELD OF THE INVENTION

The subject invention relates to the art of vehicles and, more particularly, to a vehicle differential.

BACKGROUND

Vehicles may include a differential that converts a rotational input from a transmission or gear box to a rotational output driving one or more wheels. Typically, the differential includes a differential housing having an outer surface that supports a ring gear. The differential housing also supports a planetary gear set that is operatively coupled to the one or more wheels. A pinion gear engages with the ring gear. The pinion gear may be driven by a drive shaft. The ring gear is bonded to the outer surface of the differential housing. In some cases, the bond may take the form of one or more mechanical fasteners. In other cases, the bond may take the form of a weld. In still other cases, the bond may take the form of an interference fit.

Occasionally, a ring gear mounted and bonded through a weld or an interference fit may suffer from a misalignment during assembly. A misalignment of the ring gear relative to the differential housing may lead to undesirable wear on the pinion gear and/or create unwanted noise. Accordingly, it is desirable to provide a mechanism that promotes proper alignment of the ring gear and the differential housing.

SUMMARY OF THE INVENTION

In accordance with an exemplary embodiment, a differential housing includes a body including an outer surface. The body has a first end, a second end, and an intermediate portion extending therebetween. A ring gear support member extends outwardly of the body at the second end. A ring gear support surface forms a first section of the intermediate portion. The ring gear support surface defines a first outer diameter of the intermediate portion. A ring gear is mounted to the outer surface of the body. The ring gear includes an inner annular surface having a first region defining a first inner diameter and a second region defining a second inner diameter. The first region includes a sawtooth profile to establish a desired alignment of the ring gear and the body and the second region facilitating an interference fit with the ring gear support surface.

In accordance with another aspect of an exemplary embodiment, a differential includes a housing portion having an outer surface and an inner surface defining a gear receiving zone. A first axle tube extends outwardly of the housing portion in a first direction. A second axle tube extends outwardly of the housing portion in a second direction opposite of the first direction. A differential housing is arranged in the housing portion. The differential housing includes a body including an outer surface. The body has a first end, a second end, and an intermediate portion extending therebetween. A ring gear support member extends outwardly of the body at the second end. A ring gear support surface forms a first section of the intermediate portion. The ring gear support surface defines a first outer diameter of the intermediate portion. A ring gear is mounted to the outer surface of the body. The ring gear includes an inner annular surface having a first region defining a first inner diameter and a second region defining a second inner diameter. The first region includes a sawtooth profile to establish a desired alignment of the ring gear and the body and the second region facilitating an interference fit with the ring gear support surface.

The above features and advantages, and other features and advantages, of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
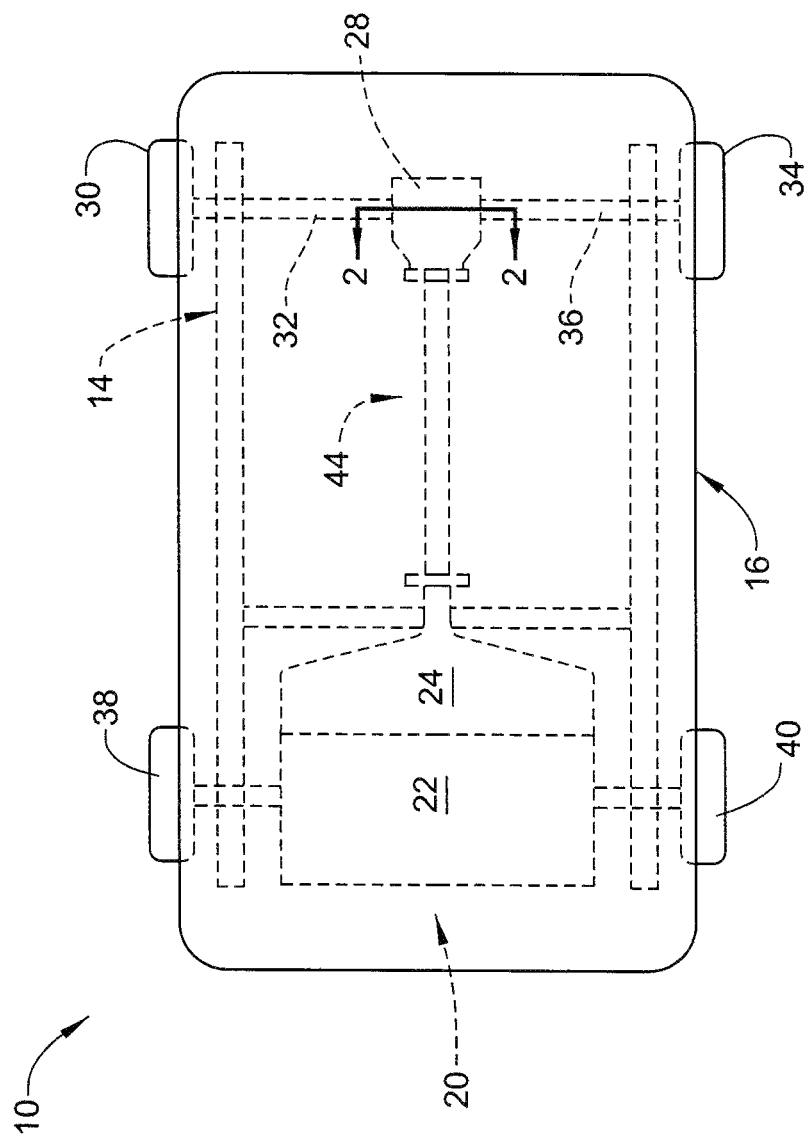
FIG. 1 depicts a vehicle including a differential, in accordance with an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 includes a chassis 14 supporting a body 16. Chassis 14 also supports a drivetrain 20 including a motor 22, a transmission 24, and a rear differential 28. It is to be understood that motor 22 may take the form of an electric motor, an internal combustion engine, a hybrid electric motor, or other forms of prime movers that provide motive power to vehicle 10. Rear differential 28 is coupled to a first rear wheel 30 through a first axle 32 and to a second rear wheel 34 through a second axle 36. Vehicle 10 may also include first and second front wheels 38 and 40. It is also to be understood that while shown as having a rear wheel drive, other drive configurations including front wheel drive and four wheel drive may also be employed. Rear differential 28 is coupled to transmission 24 through a driveshaft 44.

Figure 2:
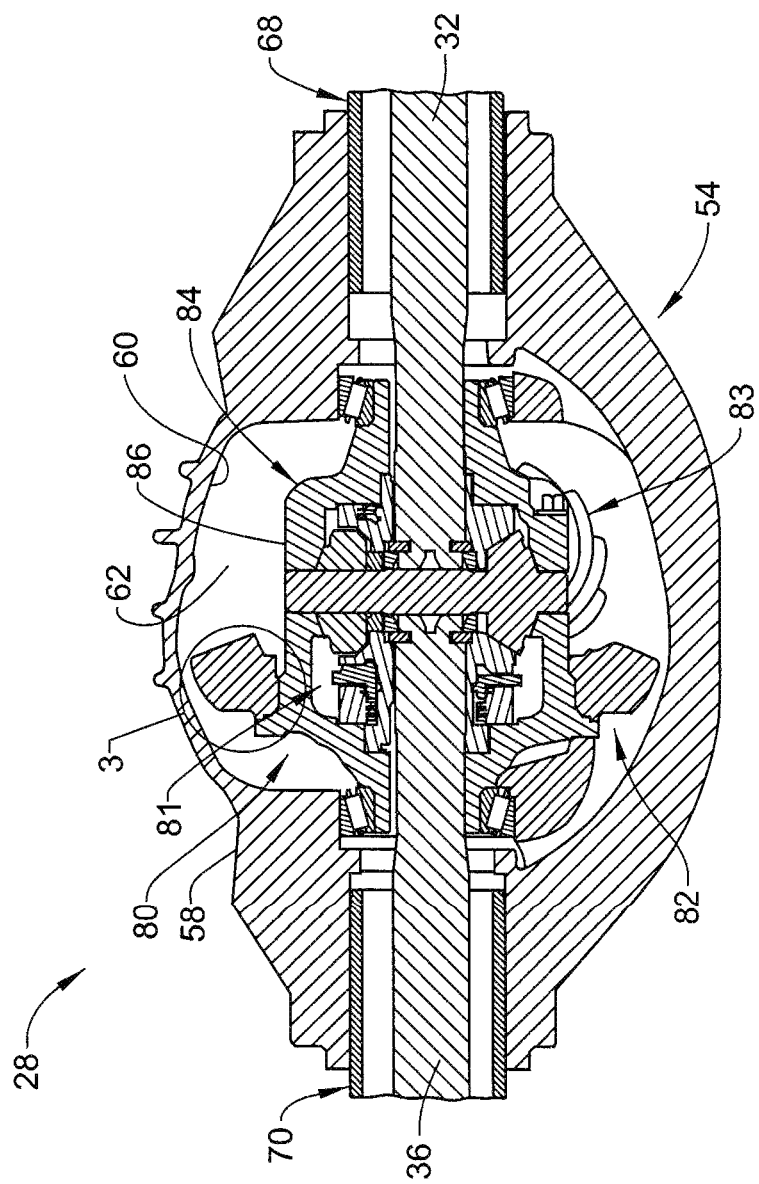
FIG. 2 depicts a partially cut-away view of the differential taken along line 2-2 of FIG. 1.

In accordance with an aspect of an exemplary embodiment, rear differential 28 includes a housing portion 54 having an outer surface 58 and an inner surface 60 that defines a gear receiving zone 62 as shown in FIG. 2. Housing portion 54 also supports a first axle tube 68 that surrounds first axle 32 and a second axle tube 70 that surrounds second axle 36. Gear receiving zone 62 houses a differential housing 80 that supports a planetary gear set 81 and a ring gear 82. Ring gear 82 engages with a pinion 83 driven by driveshaft 44. Pinion 83 engages with ring gear 82 to rotate differential housing 80 which in turn drives first and second axles 32 and 36 through planetary gear set 81.

Figure 3:
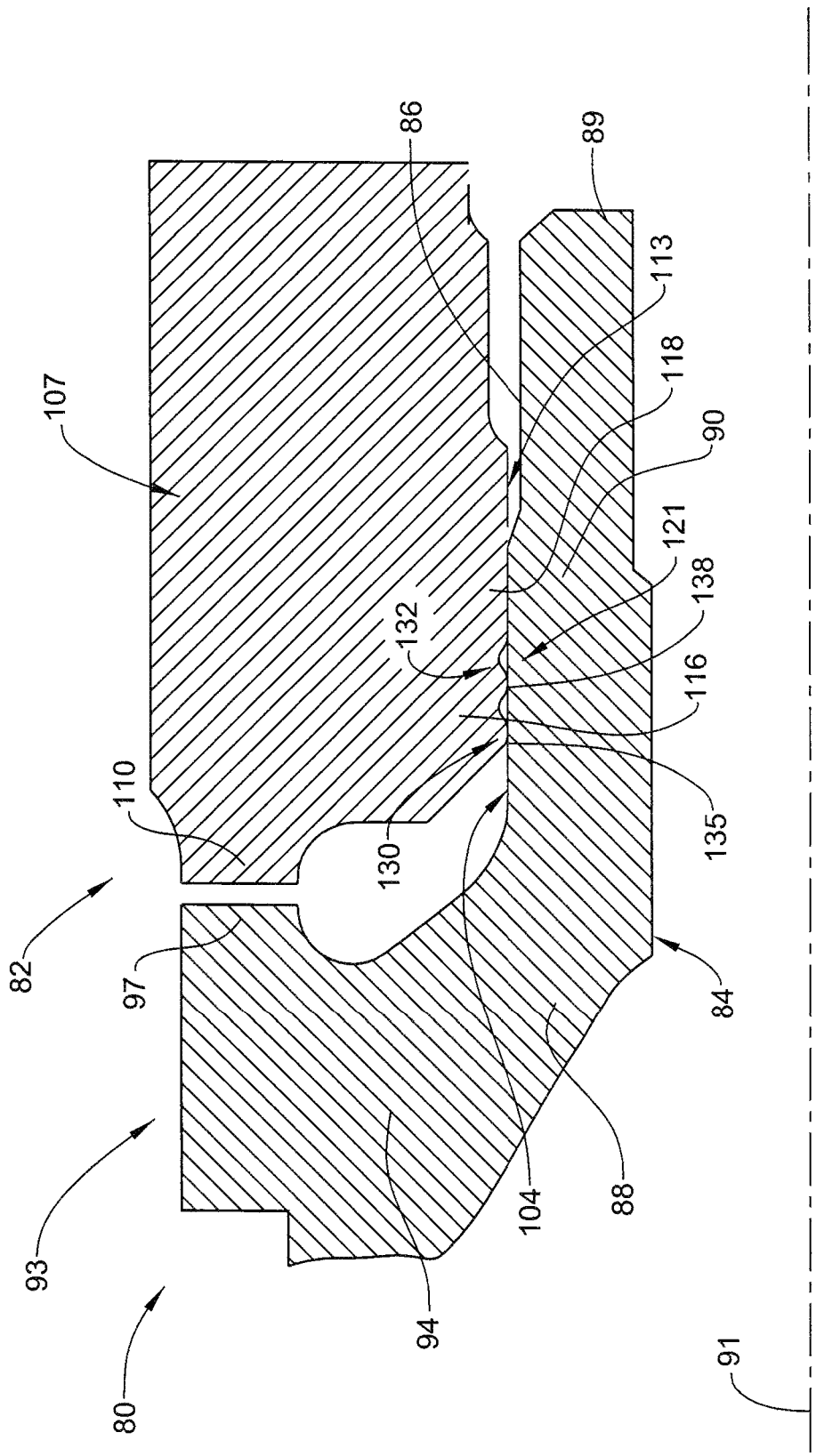
FIG. 3 is a partial cross-sectional view of a differential housing and ring gear of the differential taken at circle 3 of FIG. 2.

Reference will now follow to FIG. 3 in describing differential housing 80 and ring gear 82. Differential housing 80 includes a body 84 having an outer surface 86 including a first end 88, a second end 89, and an intermediate portion 90 that extends along an axial axis 91. Second end 89 includes a ring gear support member 93 that provides a desired position of ring gear 82 on body 84. Ring gear support member 93 includes a radially outwardly projecting portion 94 that extends from body 84 at second end 89 and an axially projecting portion 97. Ring gear 82 may be positioned on body 84 abutting axially projecting portion 97 to establish a desired position on outer surface 86. Differential housing 80 also includes a ring gear support surface 104 formed on outer surface 86 of body 84. Ring gear support surface 104 establishes a first outer diameter (not separately labeled) of intermediate portion 90 that is adjacent ring gear support member 93.

Figure 4:
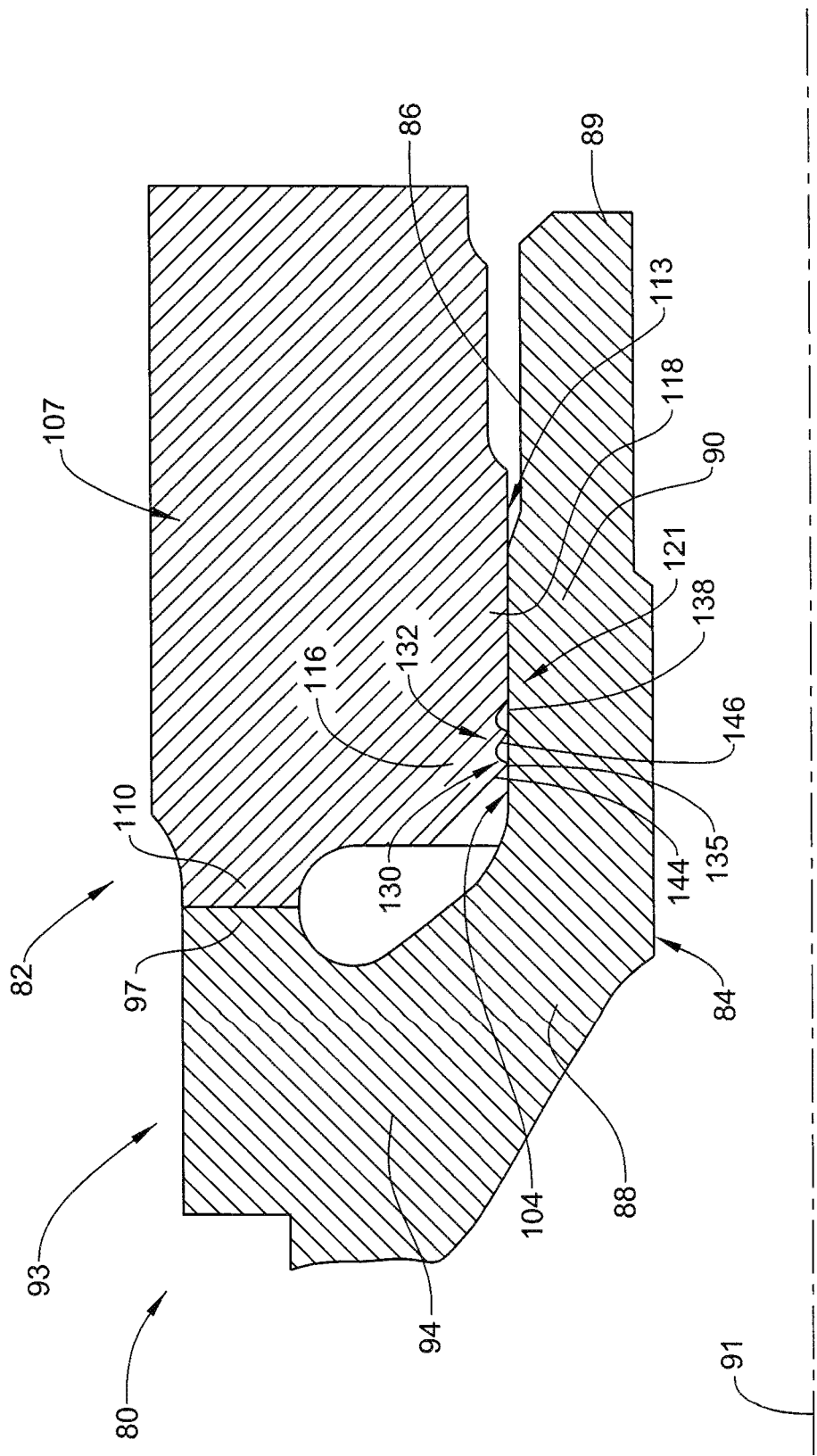
FIG. 4. is a schematic view of the ring gear in accordance with an exemplary aspect being aligned with the differential housing.
Figure 5:
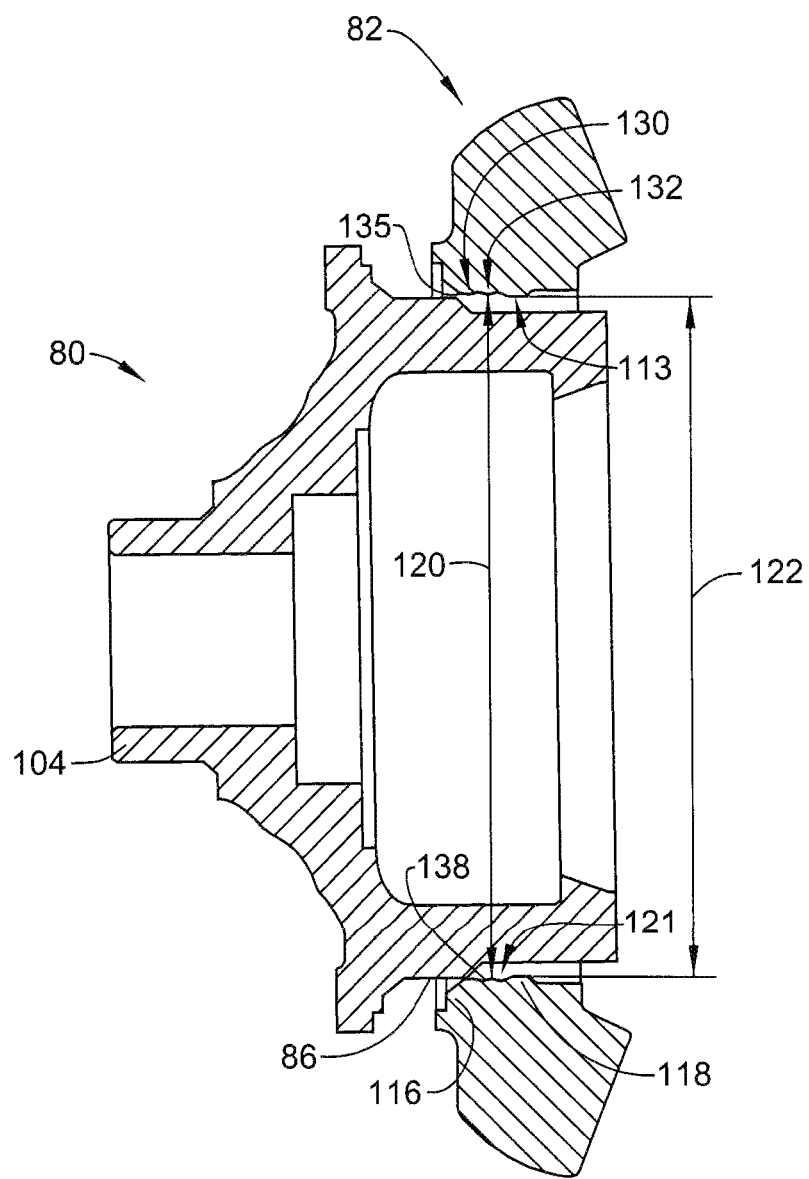
FIG. 5 is a partially cut-away schematic view of the ring gear being positioned for installation to the differential housing.

In accordance with an exemplary aspect illustrated in FIG. 3, ring gear 82 includes a ring gear body 107 having a support element 110 that projects axially outwardly along axial axis 91. Following assembly of ring gear 82 onto differential housing 80, support element 110 may abut axially projecting portion 97 of ring gear support member 93 (FIG. 4). Ring gear 82 also includes an inner annular surface 113 that is supported by outer surface 86 upon installation to differential housing 80. Inner annular surface 113 includes a first region 116 and a second region 118. First region 116 includes a sawtooth profile 121 that establishes a first inner diameter 120 of ring gear 82 (FIG. 5). Second region 118 establishes a second inner diameter 122 of ring gear 82 (FIG. 5). In accordance with an exemplary aspect, the first inner diameter 120 is between about 0.25 and about 0.75-mm greater than the first outer diameter. In accordance with another exemplary aspect, first inner diameter 120 is about 0.5-mm greater than the first outer diameter of differential housing 80. Second inner diameter 122 is smaller than the first inner diameter 120 and is sized to facilitate an interference fit with ring gear support surface 104.

Referring to FIGS. 3-4, sawtooth profile 121 includes a first tooth element 130 and a second tooth element 132 in accordance with an aspect of an exemplary embodiment. First tooth element 130 constitutes a leading tooth 135 while second tooth element 132 defines a trailing tooth 138. The term "leading tooth" defines the one of the first and second tooth elements 130 and 132 that leads when ring gear 82 is installed to differential housing 80. As seen in FIG. 4, first tooth element 130 includes a first angled surface portion 144 having a first angle (not separately labeled) and second tooth element 132 includes a second angled surface portion 146 having a second angle (also not separately labeled) that is greater than the first angle and which promotes a desired alignment of ring gear 82 with respect to differential housing 80.

Figure 6:
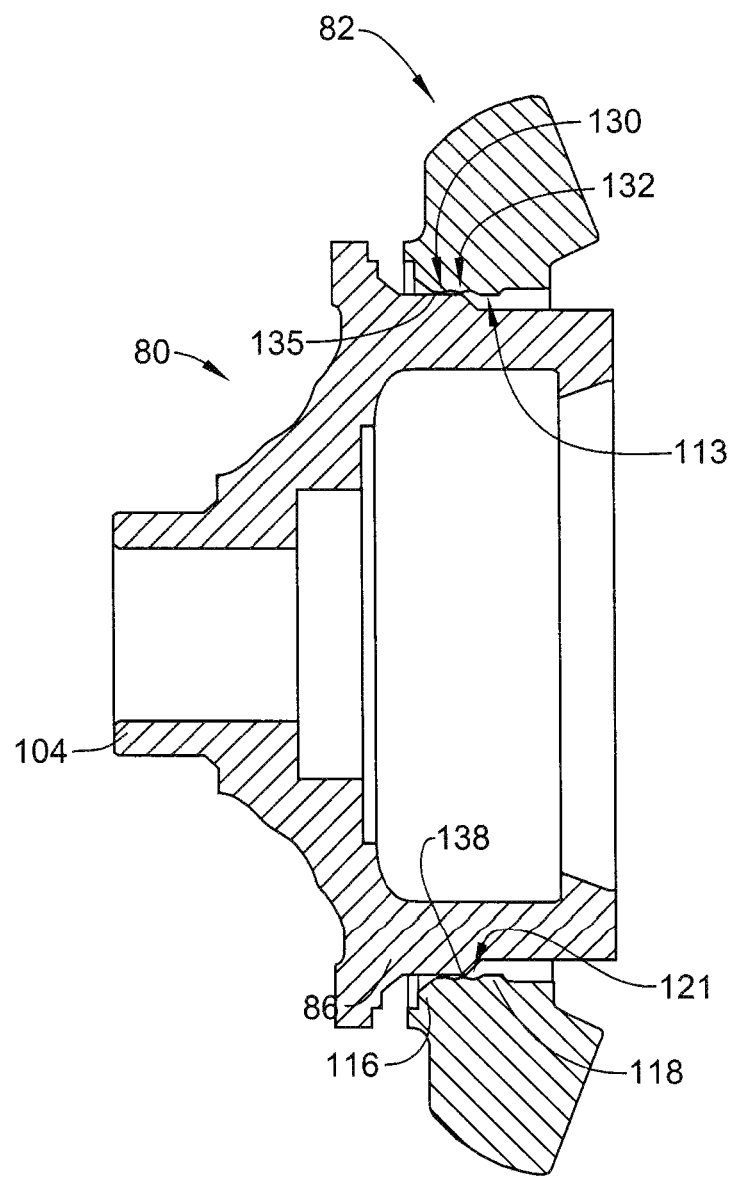
FIG. 6 is a partially cut-away schematic view of the ring gear being positioned on the differential housing in accordance with an exemplary aspect.
Figure 7:
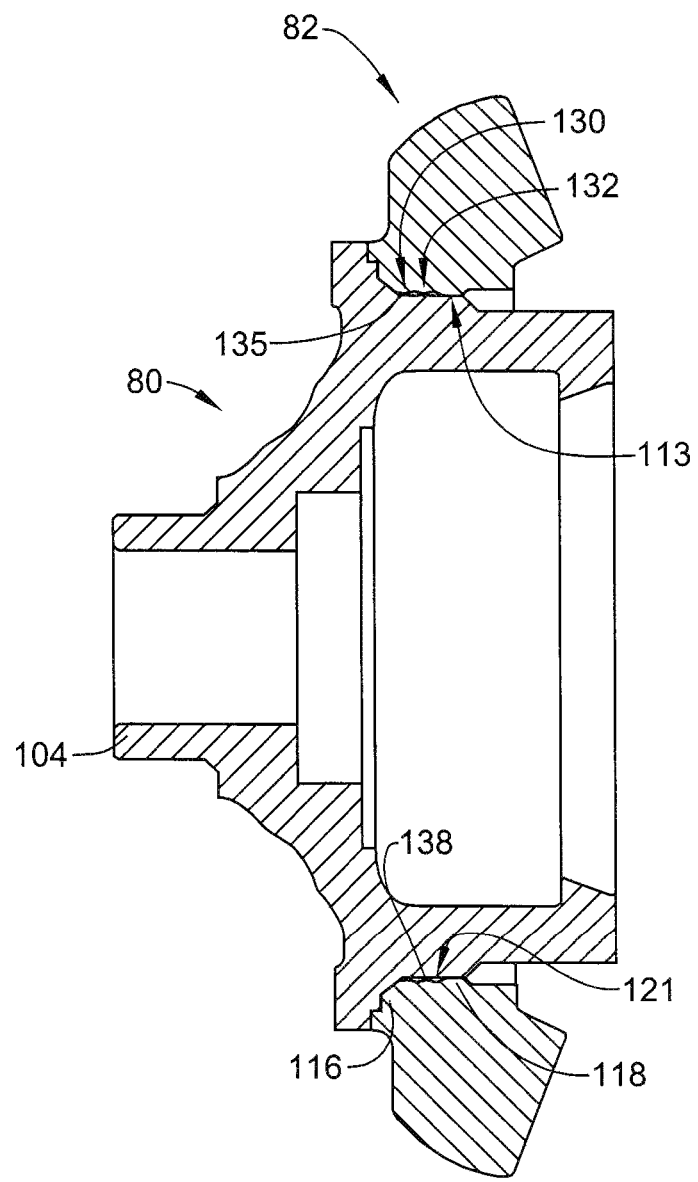
FIG. 7 is a partially cut-away schematic view of the ring gear being press-fit to the differential housing in accordance with an exemplary aspect.

In accordance with an exemplary aspect, the second angle is between about 5° and about 15°. In accordance with another exemplary aspect, the second angle is about 10°. Sawtooth profile 121 promotes a selected alignment of ring gear 82 and differential housing 80. As shown schematically in FIG. 5, ring gear 82 is positioned on differential housing 80 with sawtooth profile 121 on first region 116 at a leading edge (not separately labeled) of outer surface 86. Ring gear 82 is advanced toward ring gear support surface 104 with first and second tooth elements 130 and 132 establishing the selected alignment of ring gear 82 relative to differential housing 80 as shown schematically in FIG. 6. More specifically, second region 118 of inner annular surface 113 is shifted toward ring gear support surface 104. Ring gear 82 may then be further shifted and fully seated onto body 84 with second region 118 being press-fit onto ring gear support surface 104 as shown schematically in FIG. 7. The use of sawtooth profile 121 greatly reduces installation and initial alignment errors so as to promote better production results.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A differential housing comprising:
a body including an outer surface, the body having a first end, a second end, and an intermediate portion extending therebetween;
a ring gear support member extending outwardly of the body at the second end;
a ring gear support surface defining a first outer diameter of the intermediate portion; and
a ring gear mounted to the outer surface of the body, the ring gear including an inner annular surface having a first region defining a first inner diameter and a second region defining a second inner diameter, the first region including a sawtooth profile to establish a desired alignment of the ring gear and the body and the second region facilitating an interference fit with the ring gear support surface, wherein the sawtooth profile includes at least two tooth elements, a first tooth element of the at least two tooth elements defining a first circumferential portion of the inner annular surface and a second tooth element of the at least two tooth elements defining a second circumferential portion of the inner annular surface that is axially spaced from the first circumferential portion, wherein the first tooth element defines a leading tooth having a first angled surface portion including a first angle relative to an axial axis of the body and the second tooth element defines a trailing tooth having a second angled surface portion having a second angle relative to the axial axis of the body, the second angle being greater than the first angle.

2. The differential housing according to claim 1, wherein the second angle is between about 5° and about 15°.

3. The differential housing according to claim 2, wherein the second angle is about 10°.

4. The differential housing according to claim 1, wherein the second inner diameter is defined by the sawtooth profile and is between about 0.25 and about 0.75-mm greater than the first outer diameter.

5. The differential housing according to claim 4, wherein the second inner diameter is between about 0.5-mm greater than the first outer diameter.

6. A differential comprising:
a housing portion including an outer surface and an inner surface defining a gear receiving zone;
a first axle tube extending outwardly of the housing portion in a first direction;
a second axle tube extending outwardly of the housing portion in a second direction opposite of the first direction; and a differential housing arranged in the housing portion, the differential housing comprising:
    a body including an outer surface, the body having a first end, a second end, and an intermediate portion extending therebetween;
    a ring gear support member extending outwardly of the body at the second end;
    a ring gear support surface forming a first section of the intermediate portion, the ring gear support surface defining a first outer diameter of the intermediate portion; and
    a ring gear mounted to the outer surface of the body, the ring gear including an inner annular surface having a first region defining a first inner diameter and a second region defining a second inner diameter, the first region including a sawtooth profile establishing a desired alignment of the ring gear and the body and the second region facilitating an interference fit with the ring gear support surface, wherein the sawtooth profile includes at least two tooth elements, a first tooth element of the at least two tooth elements defining a first circumferential portion of the inner annular surface and a second tooth element of the at least two tooth elements defining a second circumferential portion of the inner annular surface that is axially spaced from the first circumferential portion, wherein the first tooth element defines a leading tooth having a first angled surface portion including a first angle relative to an axial axis of the body and the second tooth element defines a trailing tooth having a second angled surface portion having a second angle relative to the axial axis of the body, the second angle being greater than the first angle.

7. The differential according to claim 6, wherein the second angle is between about 5° and about 15°.

8. The differential according to claim 7, wherein the second angle is about 10°.

9. The differential according to claim 6, wherein the second inner diameter is defined by the sawtooth profile and is between about 0.25 and about 0.75-mm greater than the first outer diameter.

10. The differential according to claim 9, wherein the second inner diameter is between about 0.5-mm greater than the first outer diameter.

11. A ring gear for a vehicle differential comprising:
    an inner annular surface having a first region defining a first inner diameter and a second region defining a second inner diameter, the first region including a sawtooth profile establishing a desired alignment of the ring gear relative to a body and the second region facilitating an interference fit between the ring gear and the body, wherein the sawtooth profile includes at least two tooth elements, a first tooth element of the at least two tooth elements defining a first circumferential portion of the inner annular surface and a second tooth element of the at least two tooth elements defining a second circumferential portion of the inner annular surface that is axially spaced from the first circumferential portion, wherein the first tooth element defines a leading tooth having a first angled surface portion including a first angle relative to an axial axis and the second tooth element defines a trailing tooth having a second angled surface portion having a second angle relative to the axial axis, the second angle being greater than the first angle.

12. The ring gear according to claim 11, wherein the second angle is between about 5° and about 15°.

13. The ring gear according to claim 12, wherein the second angle is about 10°.

* * * * *